Jan. 22, 1929.
T. MULHOLLAND
1,699,985
MACHINE FOR CROSS SHEARING RUBBER STRIPS
Original Filed July 29, 1925
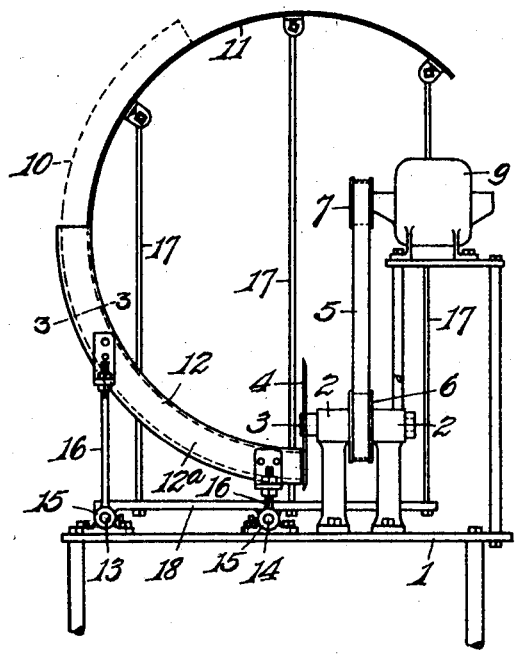
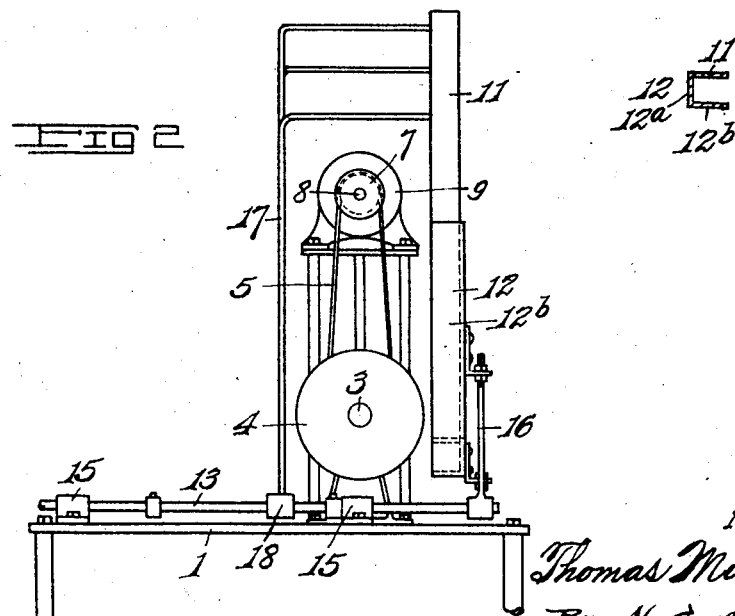
INVENTOR
Thomas Mulholland
By N. E. Dunlap
ATTORNEY Patented Jan. 22, 1929.

1,699,985

UNITED STATES PATENT OFFICE.

THOMAS MULHOLLAND, OF WHEELING, WEST VIRGINIA, ASSIGNOR, BY DIRECT AND MESNE ASSIGNMENTS, TO VALLEY RUBBER COMPANY, OF WHEELING, WEST VIRGINIA, A CORPORATION OF WEST VIRGINIA.

MACHINE FOR CROSS-SHEARING RUBBER STRIPS.

Application filed July 29, 1925. Serial No. 46,826. Renewed July 21, 1928.

This invention relates to a machine for cutting or shearing strips of rubber in sections, and it has for its primary object to provide a machine for cutting into short lengths narrow strips of rubber produced by annular slitting of discarded solid rubber vehicle tires.

A further object is to provide a simple mechanism whereby strips of rubber produced by lengthwise or annular division of rubber tires, as by means of the machine described in my co-pending patent application, Serial No. 46,824, filed July 29, 1925, may be severed into lengths suitable for conversion into relatively small rubber articles, as rubber balls.

In describing the invention in detail, reference is herein had to the accompanying drawings, in which—

Figure 1 is a front elevation of the invention;

Figure 2 is an end elevation of the same; and

Figure 3 is a section on line 3—3, Fig. 1.

Referring to said drawings, 1 indicates generally a supporting stand which has mounted on the rearward portion thereof bearings 2 in which is journaled a shaft 3 having fixed on its front end a revoluble cutting disk 4, as shown. Said shaft is preferably driven by a belt 5 connecting pulleys 6 and 7 carried, respectively, by said shaft and the rotor shaft 8 of a suitably located electric motor 9.

Mounted upon or over the stand 1 is a carriage whereon the strip of rubber to be cut into lengths or sections, indicated in dotted lines at 10 in Fig 1, is advanced and retracted with respect to said disk. Said carriage comprises essentially a plate-like mounting 11 having the outline or curvature of the segment of a circle whose diameter is preferably greater than that of the tire of which are formed the rubber strips 10 to be acted upon. Said mounting 11 is designed to have such strip 10 conformably seat against its outer surface, and at and adjacent to the lower end thereof said mounting forms the inner wall of an enclosure 12 within which the corresponding portion of the strip 10 is received and through which the strip is advanced. Said enclosure, designed as a support for the lower end portion of such strip, is of rectangular three-sided form in cross section, having a vertical side wall 12$^a$ and an outer wall 12$^b$, the latter parallel to the opposite portion of the mounting 11. Said enclosure terminates at its lower end closely adjacent to the vertical plane of the cutting disk 4.

Said carriage is designed for advance and return movements with respect to the cutting disk so that the latter may sever transversely any portion of a strip 10 which may project from the adjacent end of the enclosure 12. While the portion of the carriage by which the mounting 11 and enclosure 12 are borne may have any desired form allowing of the shifting movements mentioned, said portion, as herein shown for illustrative purposes, comprises two parallel longitudinally extending rods 13 and 14 which are slidably mounted in bearing-like guide members 15 carried by the stand 1. Upright rods 16 and 17 carried in fixed relation to said slidable rods 13 and 14 serve as supports for the mounting 11 and enclosure 12, the rods 16 being rigidly carried by said slidable rods, and the rods 17 being fixed upon a transverse bar 18 which is, in turn, fixed on said slidable rods.

In practice, the rubber strip 10 to be cut into sections is mounted upon the curved mounting plate 11 with its lower end portion received within the enclosure 12. Following severance of each short length of said strip, effected by manually advancing the carriage with respect to the cutting disk 4 the required distance, the carriage is retracted and the strip is shifted lengthwise to project from the lower end of said enclosure a distance corresponding with the length of section to be severed on the next advance movement of the carriage, whereupon the carriage is again advanced, as described.

What is claimed is—

A machine for dividing into sections curved strips of rubber, comprising a supporting stand, a rotating cutting disk located over said stand, guide members carried by said stand, and a carriage whereon a rubber strip may be carried in its curved condition and embodying a guide-like enclosure having an end located substantially in the plane of said cutting disk, said enclosure being adapted to have said strip feed lengthwise therethrough, said carriage including horizontally disposed carrying rods which are shiftable in said guide members for presenting in the path of rotation of the cutting disk lengths of said strip which protrude from said enclosure.

In testimony whereof, I affix my signature.

THOMAS MULHOLLAND.